United States Patent

Weiss et al.

[11] Patent Number: 5,154,669
[45] Date of Patent: Oct. 13, 1992

[54] ALL-STEEL CLUTCH WITH ADJUSTABLE ANGLE OF ROTATION

[75] Inventors: Hermann Weiss; Rudolf Weiss, both of Vreden, Fed. Rep. of Germany

[73] Assignee: Atec-Weiss KG, Vreden, Fed. Rep. of Germany

[21] Appl. No.: 663,039

[22] Filed: Feb. 25, 1991

Related U.S. Application Data

[62] Division of Ser. No. 392,497, Aug. 11, 1989, abandoned.

[30] Foreign Application Priority Data

Sep. 6, 1988 [DE] Fed. Rep. of Germany ....... 3830262

[51] Int. Cl.$^5$ ............................................. F16D 3/62
[52] U.S. Cl. ......................................... 464/69; 464/81; 464/100
[58] Field of Search .................. 464/69, 81, 84, 100, 464/101

[56] References Cited

U.S. PATENT DOCUMENTS

| 854,426 | 5/1907 | Lowry | 464/69 X |
| 3,685,314 | 8/1972 | Flannelly | 464/69 |
| 4,203,303 | 5/1980 | Miller | 464/87 X |
| 4,207,758 | 6/1980 | Stone | 464/69 X |
| 4,278,161 | 7/1981 | Mower et al. | 464/69 X |

FOREIGN PATENT DOCUMENTS

1041309 10/1958 Fed. Rep. of Germany ........ 464/69

Primary Examiner—Daniel P. Stodola
Assistant Examiner—William G. Battista, Jr.
Attorney, Agent, or Firm—Sprung Horn Kramer & Woods

[57] ABSTRACT

An all-steel clutch having at least one eccentric pack of spring plates which holds the clutch halves axially at a distance in the unloaded condition and is so inclined by an acute angle to the axial normal plane that a slight axial displacement of the clutch halves in relation to one another produces a comparatively large angular offsetting, thereby enabling angular displacements caused by loading to be compensated.

15 Claims, 9 Drawing Sheets

ALL-STEEL CLUTCH WITH ADJUSTABLE ANGLE OF ROTATION

This application is a division of application Ser. No. 392,497, filed Aug. 11, 1989, now abandoned.

BACKGROUND OF THE INVENTION

The invention relates to an all-steel clutch having at least one eccentric pack of spring plates which holds the clutch halves axially at a distance in the unloaded condition.

All-steel clutches of the kind specified have of course many applications. As a rule such clutches have an annular disc pack which is disposed in one plane and connected in the peripheral direction alternately to the flanges of the clutch halves. This enables the all-steel clutch to absorb an axial offsetting or even an angular offsetting, without any appreciable rotational offsetting taking place. However, for particular applications, for example, to the adjustment of the circumferencial register of the plate cylinder of a rotary printing machine, angular changes take place due to load fluctuations which cannot be compensated, due to the rotational rigidity of the prior art all steel clutches.

SUMMARY OF THE INVENTION

It is therefore an object of the invention to so design an all-steel clutch of the kind specified that the clutch halves can be adjusted in angle of rotation in relation to one another.

This problem is solved in an all-steel clutch of the kind specified by the features wherein the pack of spring plates is inclined by an acute angle in relation to the axial normal plane, and associated with the coupling halves is an adjusting device by means of which the axial distance between the clutch halves can be adjusted.

Due to the inclined position of the pack of spring plates, the axial movement of the two clutch halves in relation to one another produces rotations of the two clutch halves in relation to one another, whereby changes of angle in the machines to be driven caused by load fluctuations can be compensated. Even with short axial adjusting movements a comparatively large angular adjustment can be achieved, in dependence on the inclined position of the pack of spring plates.

The operation of the all-steel clutch according to the invention can be optimized if the angle is between 30° and 60°, preferably 45°.

If a number of packs of spring plates are provided which are inclined to the same hand in the peripheral direction, the operation of the clutch according to the invention becomes independent of the weight of the clutch halves, since they are fixed statically in relation to one another. A particularly simple construction is achieved if the starting and terminating point of the pack of the spring plates are each connected to one clutch half.

To prevent the packs of spring plates from expanding in a clutch thus constructed, an anti-expansion device is provided which is formed, for example, by a jacketing, preferably a sheet metal jacketing, enclosing the pack of spring plates. The gap between the sheet metal jacketing and the pack of spring plates can be filled with a plastics, more particularly in rubber, thus preventing the expansion of individual plates without any reduction in the bending-resilient properties of the pack thereof.

In another way of preventing the expansion of the resilient plates, the anti-expansion device is formed by a compression spring which encloses the pack of spring plates and bears prestressably against its starting and terminating point. In case of compressive loading, the resilient plate remains stretched until the adjusted compressive force of the spring is exceeded.

In a particularly advantageous embodiment of the all-steel clutch according to the invention, the pack of spring plates is formed by two packs of resilient plates which are inclined to the same hand and one end of each of which is attached to a common point on one clutch half, the other ends being attached at different points on the other clutch half. By the subdivision of the pack of resilient plates into two component packs of plates, one pack absorbs the compressive loading, and the other pack the tensile loading, and vice versa. The result is a particularly robustly constructed all-steel clutch.

To achieve an axial movement of the clutch halves in relation to one another, an adjusting device can be provided which is actuable from outside, so that the required angle of rotation can be provided by adjustment of the axial travel.

In a further, preferred embodiment of the invention, associated with the clutch halves are further, serially connected clutch halves axially held at a distance from one another in the unloaded condition by further packs of spring plates. This combination of the approach according to the invention with a further clutch provides a clutch unit adapted in an optimum manner to the required operational conditions.

For example, the further pair of clutch halves is formed by a known disc clutch having a closed annular disc pack connected in the peripheral direction alternately to the flanges of the particular further clutch halves. Since this known annular disc pack permits axial yielding of this part of the clutch, as a result the axial path of displacement introduced via the adjusting device can be compensated to produce the angular adjustment of the clutch halves in relation to one another.

If in such a clutch unit consisting of two component clutches an angular offsetting occurs between the driving and driven shafts, the result may be the excitation of rotary oscillations. To prevent this undesirable behaviour, the flanges of the further clutch halves connected by the closed annular disc pack can be additionally adjusted via a coupling member to a fixed axial distance between such flanges.

To damp torque peaks and counteract resulting oscillations, according to another embodiment of the invention the flanges connected by the closed annular disc pack can be axially coupled with adjustable prestressing via an additional spring element. The prestressing of the additional spring element is so adjusted as to produce between the clutch halves via the axial spring travel an adjusting angle corresponding to the particular torque.

Lastly, another preferred embodiment of the invention is characterized in that the further pair of clutch halves has further component packs of spring plates oppositely inclined in the axial normal half in relation to the component packs of spring plates of the clutch halves. The opposite inclination of the packs of spring plates produces an addition of the angles of rotation for the same axial displacement. For example, for the same axial operation of the adjusting device, with two identical but oppositely inclined packs of spring plates the angle of rotation is doubled in comparison with the single construction.

In particular applications, if the coupling halves cannot be axially adjusted in relation to one another directly via the adjusting device, the embodiment of the all-steel clutch is such that the clutch halves are enclosed by a pressure-tight casing, and an inlet valve is provided which experiences pressure for the axial adjustment of the clutch halves. The construction according to the invention can also be applied pneumatically by means of the medium, for example, air disposed inside the pressure-tight casing and compressible via the operation of the valve.

The invention will now be described in greater detail with reference to the drawings, which illustrate seven embodiments thereof, and wherein:

BRIEF DESCRIPTION OF THE DRAWINGS

FIG. 1 illustrates a first embodiment of the invention, FIG. 1a being a partially diagrammatic cross-section, FIG. 1b a diagrammatic elevation taken along the line 1b—1b in FIG. 1a, FIG. 1c is a section taken along the line 1c—1c in FIG. 1b, during the compressive loading of the pack of spring plates 7a, FIG. 1d showing a variant of the embodiment of FIG. 1c, FIG. 1e showing a variant of the embodiment shown in FIG. 1d, and FIG. 1f being a section taken along the line C—C in FIG. 1e.

FIG. 2 shows a second embodiment of the invention, FIG. 2a being a partial elevation taken along the line 2a—2a in FIG. 2b, and FIG. 2b showing a cross-section.

DETAILED DESCRIPTION OF THE INVENTION

The first embodiment, shown in FIG. 1, illustrates the simplest construction of a clutch according to the invention having an adjustable angle of rotation. Clutch halves 1, 2 each connected to a hub 3, 4 and a shaft 5, 6 are coupled via a pack 7 of spring plates, each pack being attached to one of the two clutch halves, for example, by means of a screwed connection. The pack of resilient plates is on the one hand disposed eccentrically—i.e., outside the centre point of the clutch halves—, and on the other hand inclined to the axial normal plane of the clutch. The angle of inclination is about 45. With a change of distance between the clutch halves 1, 2, they rotate by a predetermined angle in relation to one another.

Figure 1A:
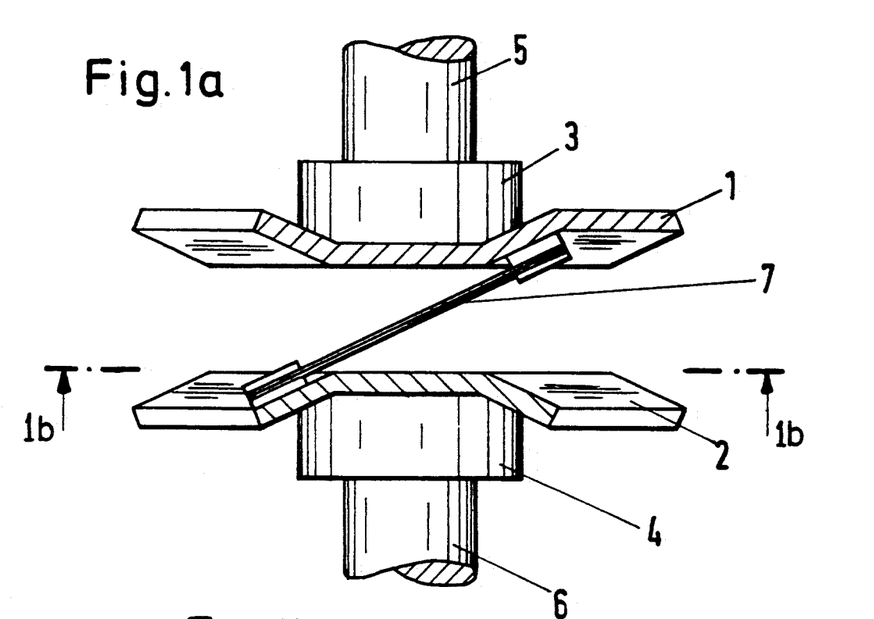
Figure 1B:
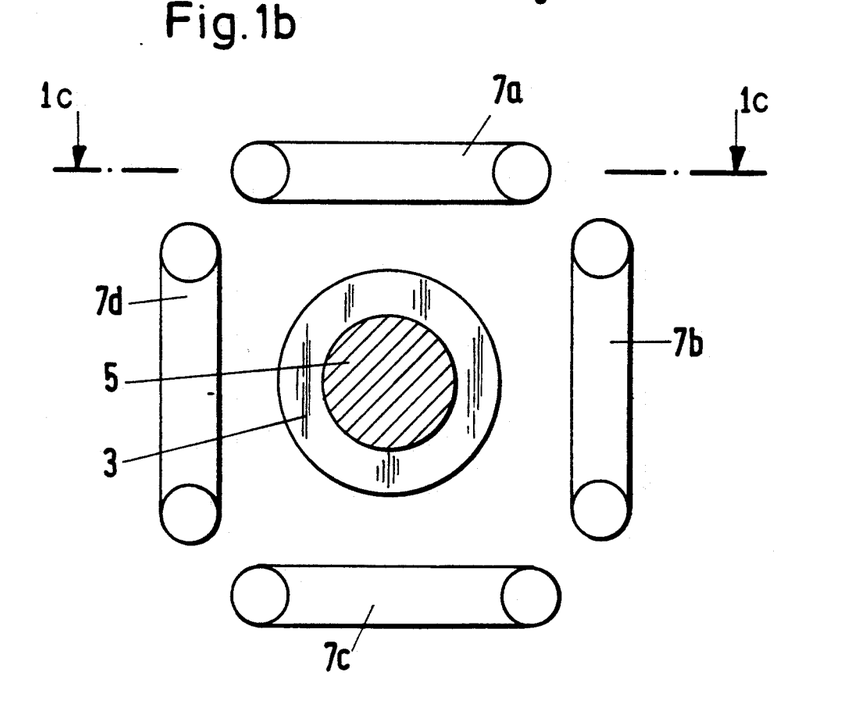
Figure 1C:
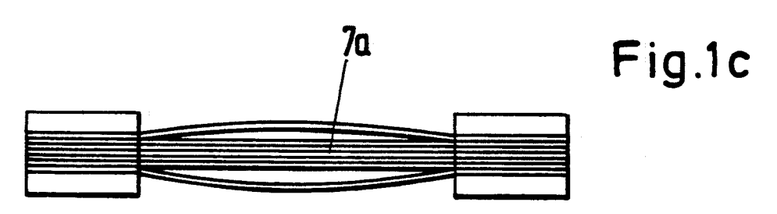

For reasons of symmetry, for example, four such packs of spring plates 7a-7d, as shown in FIG. 1b, are advantageously distributed over the periphery of the clutch halves 1, 2. As a result, the construction is independent of the weight of the clutch parts.

Figure 1D:
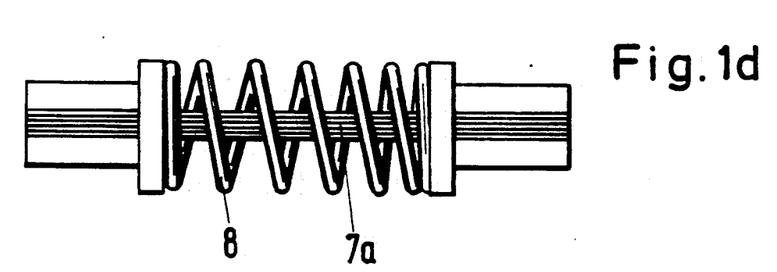

In this first embodiment of the invention, either exclusively tensile stressing or exclusively compressive stressing acts on the packs of spring plates 7a-7d, in dependence on the direction of rotation. To prevent the expansion of the individual plates of the pack in the latter case, as shown diagrammatically, for example, in FIG. 1c, according to the invention the pack of spring plates 7a is enclosed with a spiral compression spring 8 which bears against the particular connecting points on one or other of the clutch halves 1, 2 and is acted upon by a prestressing as shown in FIG. 1d. The compression spring 8 prestresses the pack of spring plates 7a in the sense of expansion, thus preventing the expansion or arching of the individual plates, as long as the compressive force of the spring 8 is not exceeded.

Figure 1E:
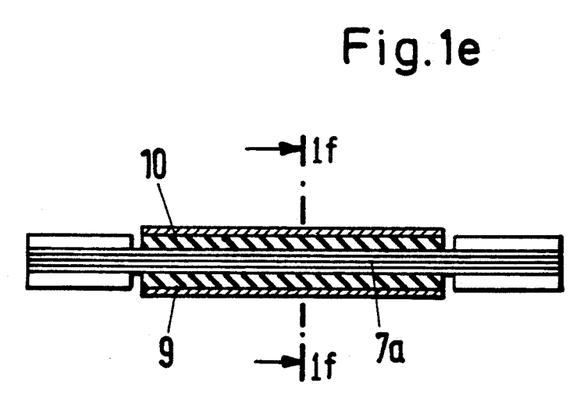
Figure 1F:
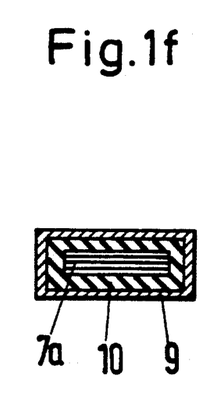

As an alternative to the anti-expansion device shown in FIG. 1d, FIG. 1e illustrates how the pack 7a of spring plates is enclosed with a sheet metal jacket 9, the cavity between the sheet metal jacket and the pack of spring plates being filled with a rubber-like material 10. This also prevents individual plates from expanding when the pack 7a is subjected to compressive loading. Due to the rubber-filled jacketing, the bending-resilient properties of the plates remain preserved.

Figure 2A:
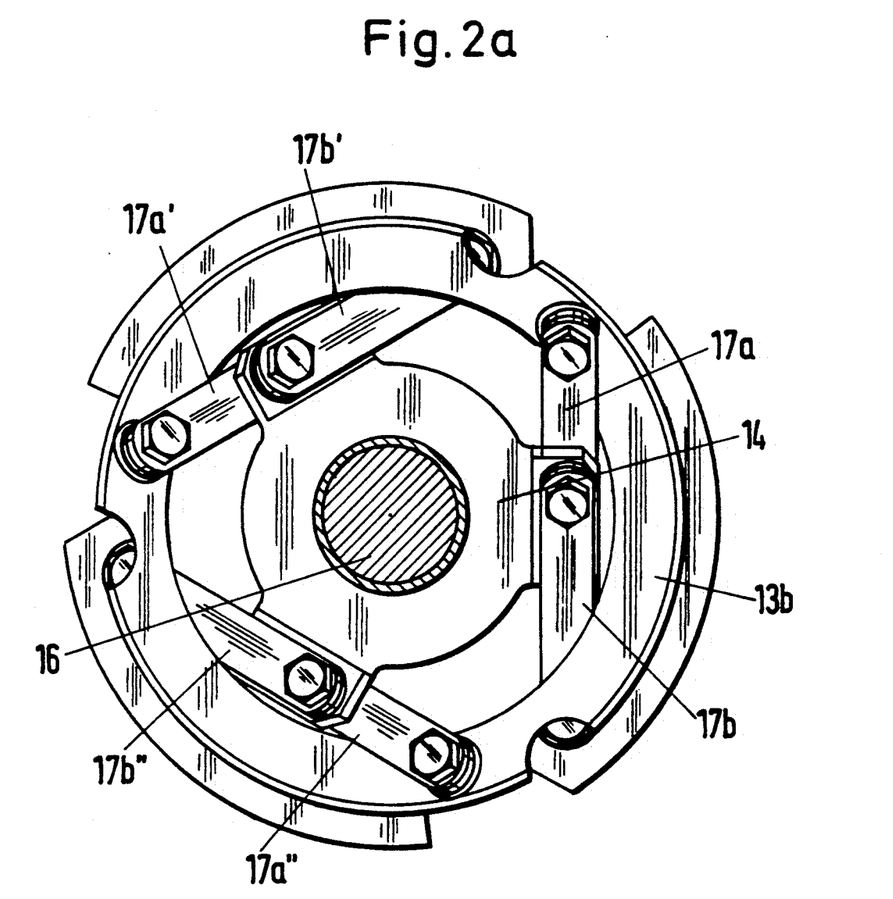
Figure 2B:
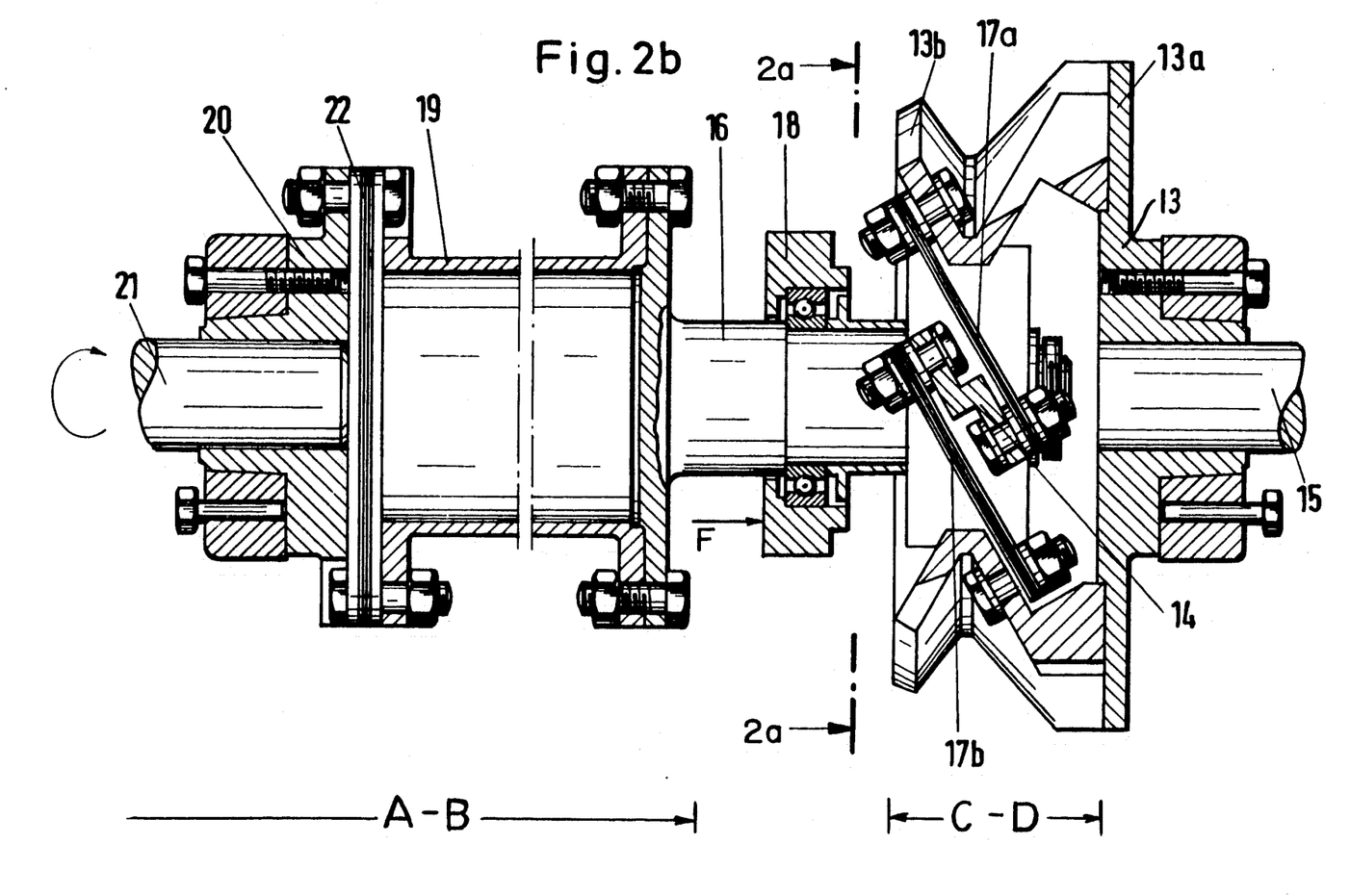

The second embodiment of the invention, which is illustrated in FIGS. 2a and 2b, comprises a serial connection comprising a clutch arrangement wherein clutch halves 13; 14 are connected via component packs of resilient plates 17, 17a, 17b inclined to the axial normal plane, and further clutch halves 19, 20 are connected via a closed annular disc pack 22 which is connected in the peripheral direction alternately to the flanges of the further clutch halves 19, 20. The further clutch half 20 is connected to a shaft 21 to be driven. The part of the clutch with the inclined component packs of spring plates 17a, 17b is connected via a hub 13a to the driving shaft 15, the hub 13a being connected unitarily to an external ring 13b. Each end of the component packs of spring plates 17a, 17b is connected to the external ring 13b, each other end being connected jointly at a point to the clutch half 14. Three component packs of spring plates 17a, 17b, 17a', 17b' and 17a'', 17b'' are disposed distributed over the periphery.

The coupling half 14 is connected to a shaft 16 via an adjusting device 18 constructed in the form of an axially displaceable bearing. The shaft 16 is connected to the further clutch half 19 via a flanged connection. The clutch arrangement described operates as follows:

If the adjusting device 18 is so acted upon from outside that the axial distance between the shafts 16 and 15 is changed, this axial movement is converted into an angular movement which rotates the clutch halves 14, 13b in relation to one another. This angular movement is caused on the one hand by the eccentric arrangement of the component packs of spring plates 17a, 17b and on the other hand by their inclined position in relation to the axial normal plane of the clutch. With the illustrated angle of inclination of the component packs of spring plates 17a, 17b of about 45°, the axial movement of the adjusting device is converted in an optimum manner into the angular movement. The axial movement of the adjusting device 18 is compensated by the axial clearance which the clutch connection 19, 20, 22 can absorb, since the closed annular disc pack 22 can yield axially.

As a result, the distance between the shafts 15 and 21 can be kept constant even with a corrected angle of rotation.

The divided construction of the pack of spring plates 17a, 17b ensures that, for example, when the clutch half 14 makes an axial movement in the direction of the clutch half 13, a tensile force acts on one pack of spring plates 17a, 17a', 17a" (FIG. 2a), a compressive force acting on the other component pack of spring plates 17b, 17b', 17b" (FIG. 2a). This applies in the converse manner if the clutch half 14 makes a movement away from the clutch half 13. As shown in FIG. 2a, in each case three pairs of component packs of spring strips are provided on the periphery, but it is also possible to provide only two, or more than three such pairs of component packs of spring plates.

Figure 3:
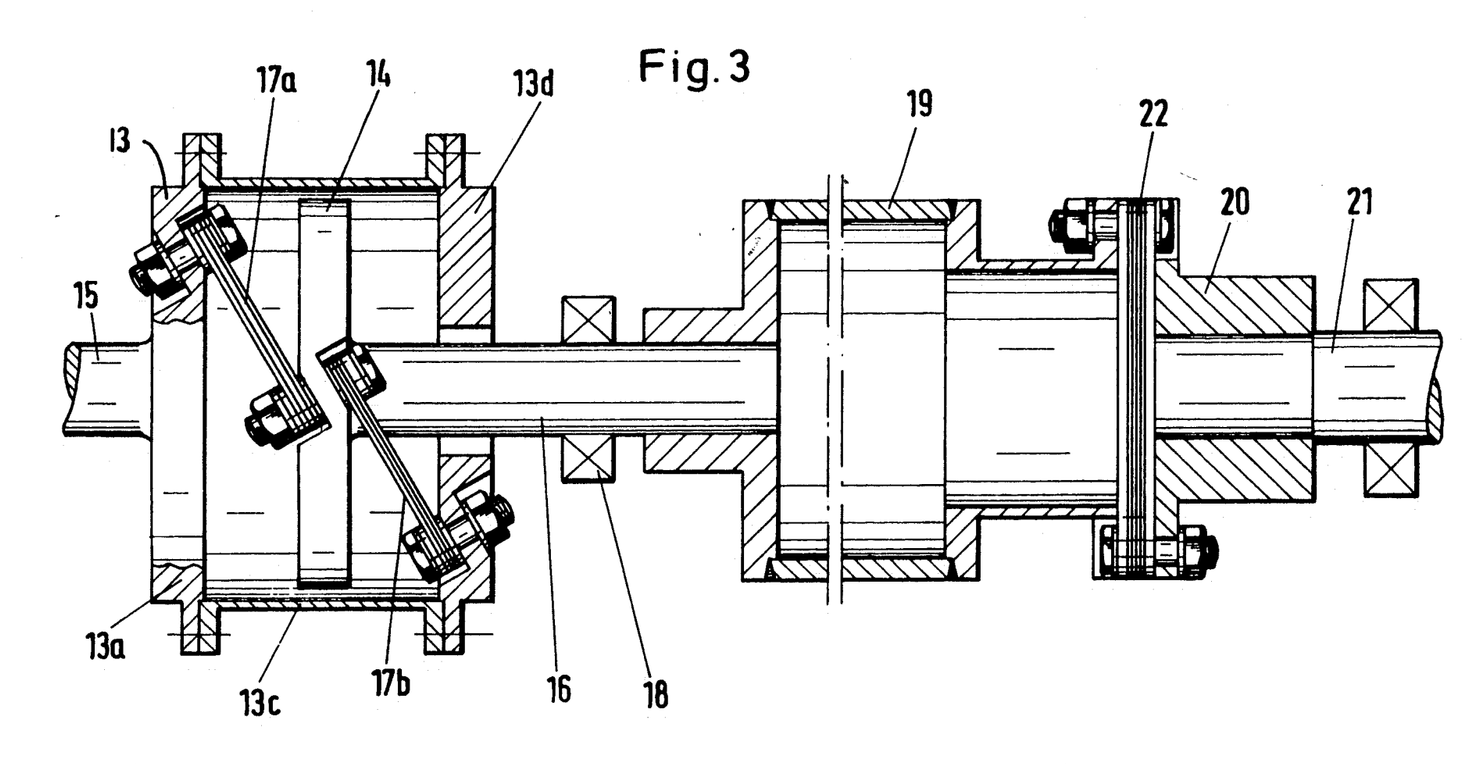
FIG. 3 is a section through a third embodiment of the invention.

The third embodiment of the invention illustrated in FIG. 3 differs from the second embodiment only by the feature that the clutch half 13 of the clutch part with the inclined packs of the spring plates 17a, 17b is so constructed that a non-rotatable intermediate tube 13c is provided. Via this intermediate tube 13c the hub 13a connected to the driving shaft 15 is non-rotatably connected to a hub 13d associated with the shaft 16. As a result, the structural components 13a, 13d, 13c form a compact unit to which one end of each of the component packs of spring plates 17a, 17b is connected at different points. The points are so selected that the component packs of spring plates 17a, 17b have the same inclination and are connected via each of their other ends to a common point on the other clutch half 14. The other clutch half 14 is again connected to the shaft 16, which can be displaced axially via a bearing 18 with an adjusting device (not shown).

Operation corresponds to that of the second embodiment; the arrangement is laterally inverted in relation to FIG. 2b, but otherwise the references correspond to those thereof.

Figure 4:
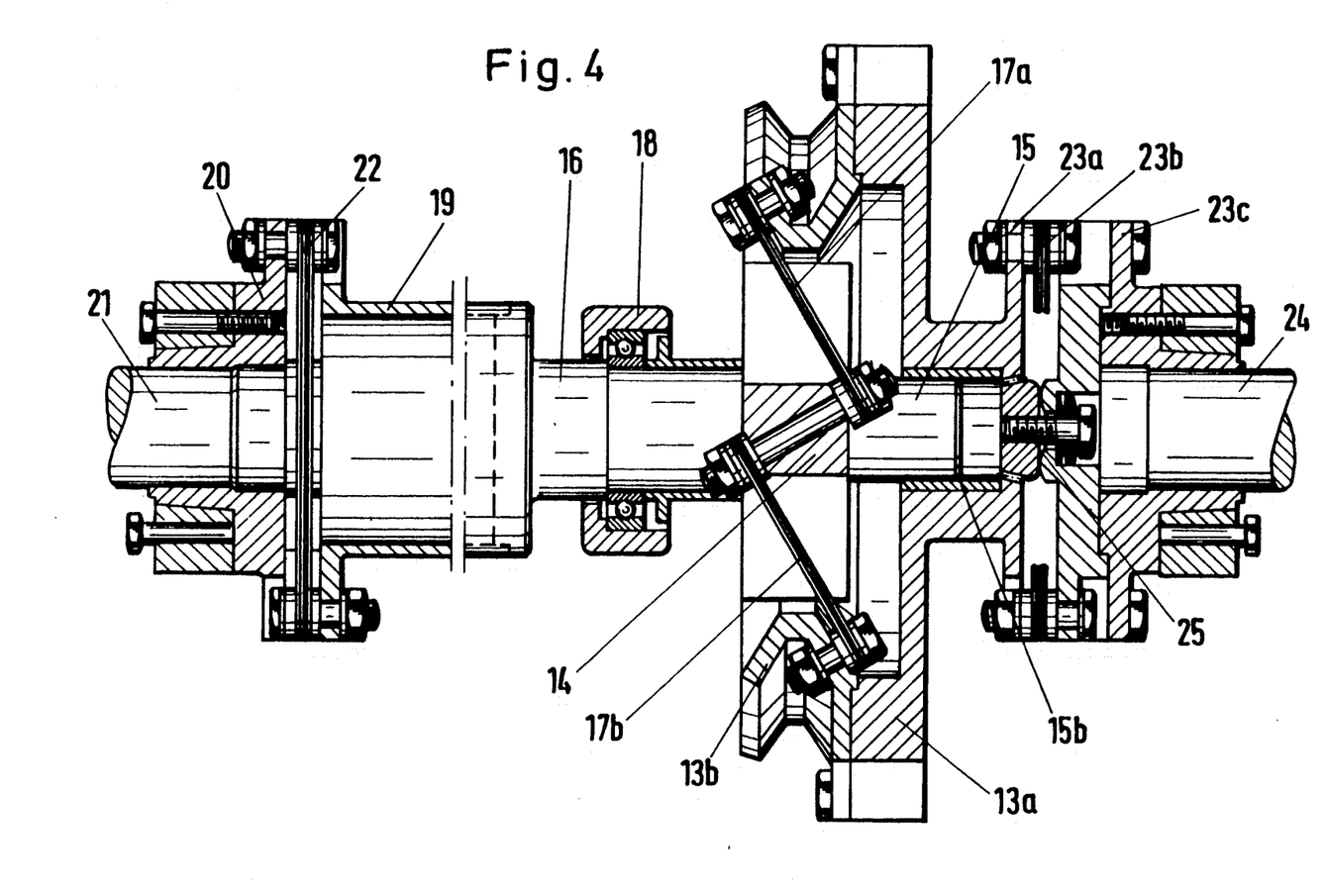
FIG. 4 shows a fourth embodiment of the invention in cross-section, taken along the lines C—D and A—B in FIG. 2b.

The fourth embodiment of the invention, shown in FIG. 4, differs from the embodiment shown in FIG. 2b by the feature that a further clutch 23a, 23b, 23c is connected to the shaft 15 connected to the hub 13a. This clutch comprises clutch halves 23a, 23c and an interconnecting annular disc pack 23b, which is closed, like the annular disc pack 22 of the further clutch arrangement 19, 20, 22. The shaft 15 is connected to the clutch arrangement 23a, 23b, 23c via an intermediate bearing 15b. Provided parallel with the annular disc pack 23b is a coupling member 25 via which the coupling halves 23a, 23c can be fixed as regards axial distance.

Figure 5:
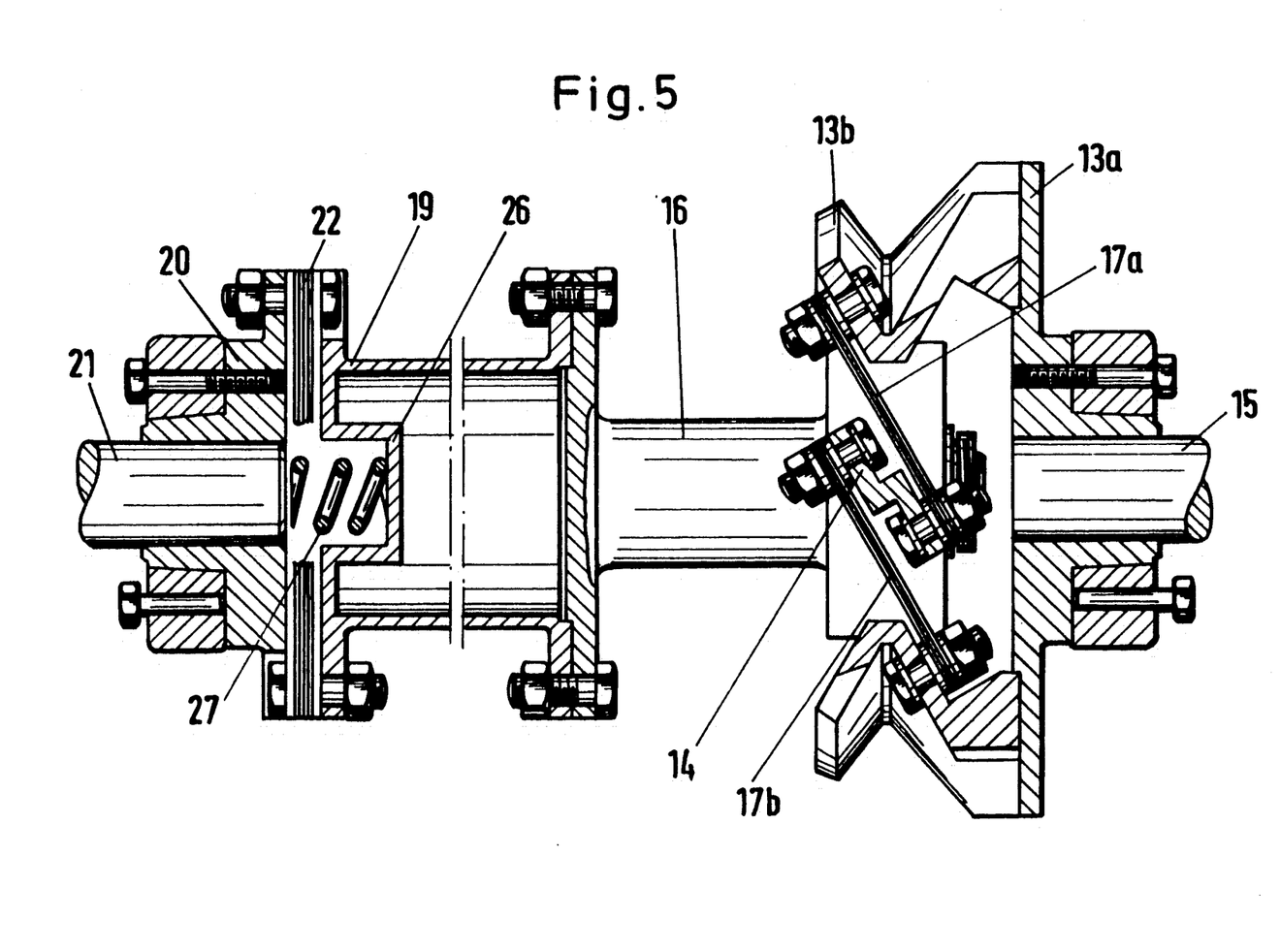
FIG. 5 shows a fifth embodiment of the invention in cross-section, taken along the lines A—B and C—D in FIG. 2b.

The fifth embodiment of the invention, shown in FIG. 5, differs from the second embodiment illustrated in FIG. 2b only by the feature that provided in the zone of the further clutch 19, 20, 22, between the flanges of the clutch halves 19, 20 connected via the closed annular disc pack 22, is an additional spring element 27 whose prestressing can be adjusted. The spring element 27 bears on the one hand against the rear side of the shaft 21 and on the other hand against a recess 26 in the flange of the further clutch half 19. By the rating of the prestressing force of the spring 27, the amount of adjustment and angle of rotation between the clutch halves 13 and 14 can be adapted to a particular torque, thus damping torque peaks.

Figure 6:
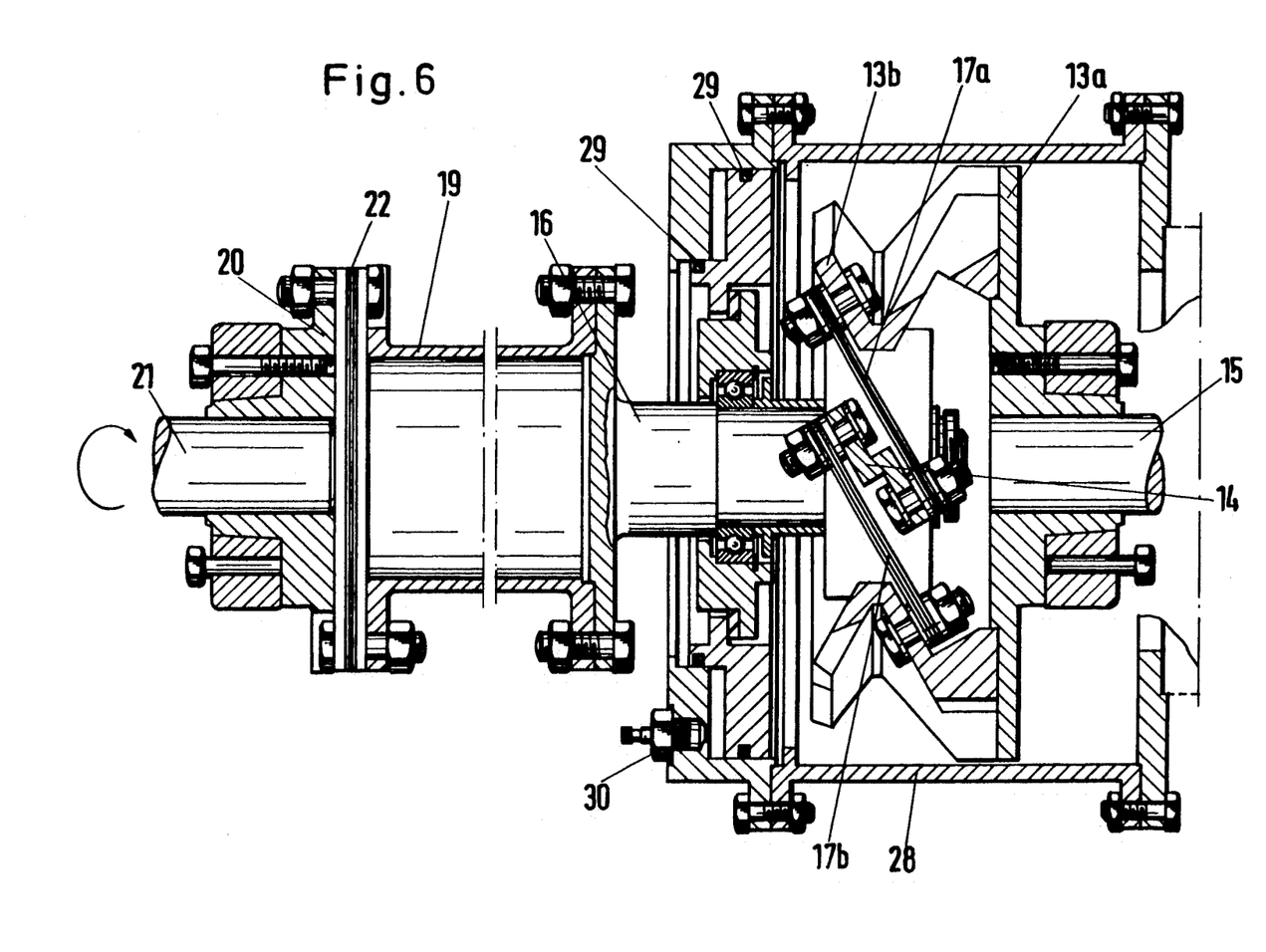
FIG. 6 shows a sixth embodiment of the invention in cross-section, taken along the lines A—B and C—D in FIG. 2b.

FIG. 6 shows a sixth embodiment of the invention which, completing the second embodiment (FIG. 2b) has a closed casing 28 which encloses the clutch halves 13, 14 of the all-steel clutch with the inclined annular disc packs 17a, 17b. Sealing rings 29 are provided for sealing against outside pressure. Via a valve 30 a compressible medium, for example, compressed air can be so introduced into the inside of the casing 28 that the axial distance of the clutch halves 14, 13 from one another can be varied by changing the internal pressure in the casing 28. As a result, the effect of the adjusting device 18 can be obtained pneumatically.

Figure 7:
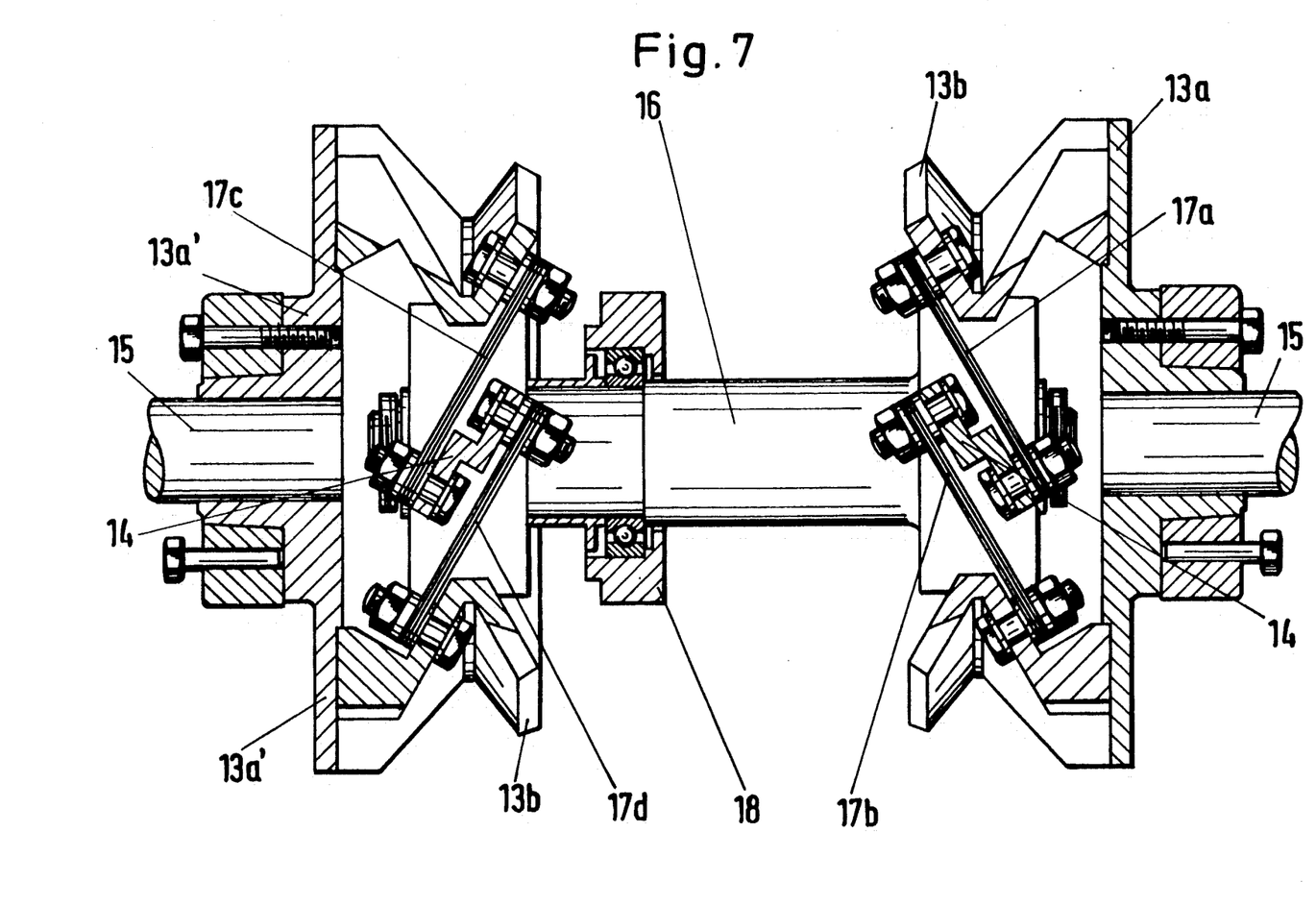
FIG. 7 shows a seventh embodiment of the invention in cross-section.

The seventh embodiment of the invention shown in FIG. 7 comprises two identical clutch parts, each of which corresponds to the right hand clutch shown in FIG. 2b. The clutch parts are so connected to the component packs of the spring strip 17a, 17b that they are disposed relative to the axial normal plane inclined to the opposite hand from the component packs of spring plates 17c, 17d. The adjusting device 18 already described is disposed between the clutch parts. When an axial adjustment is performed by the adjusting device 18, for the same axial travel the adjusting angle between the clutch halves 13a and 13a' is increased to twice the value in comparison with the adjusting angle of only one such clutch arrangement. This embodiment will therefore be selected if a large rotational offsetting is required for only a small axial adjustment.

We claim:

1. An all steel clutch comprising two clutch halves, two collinear shafts each having an axis and each connected to one of the clutch halves, at least one eccentric pack of spring plates (7, 17a, 17b, 17d) for holding the clutch halves (1, 2, 13, 14) to dispose the plates at an inclined angle in relation to an axial normal plane, wherein the at least one eccentric pack of spring plates (7, 17a, 17b, 17c, 17d) comprises two component of spring plates (17a, 17b, 17c, 17d), said one of the clutch halves having at least one radially extending arm, each of said at least one arm having two connecting portions that are circumferentially spaced from one another and wherein one end of each said component pack of a respective one of said at least one eccentric pack of spring plates is connected by said first connection means to a respective one of said connecting portions, such that said one end of each said component pack extends beyond said one end of the other of said component packs and overlaps an intermediate portion of the other of said component packs to effect a rigid linkage between each pair of component packs, second connecting means attaching the other end of each of the component packs of spring plates at peripheral areas on the other of the clutch halves (13) such that the component packs of spring plates are similarly inclined at the acute angle to the axial normal plane.

2. An all-steel clutch according to claim 1, further comprising an adjusting device connected to the shaft of one clutch half and receptive of an axially directed force to effect a rotation of the clutch halves relative to each other.

3. An all-steel clutch according to claim 2, wherein the adjusting device comprises an angularly displaceable bearing (18) mounted for axial displacement with one of the two shafts.

4. An all-steel clutch according to claim 1, further comprising clutch halves (13a',13b',19,20) serially connected to said one of the two shafts and means axially holding the serially connected clutch halves at a distance from one another in an unloaded condition comprising further packs of spring plates (17c,17d,22).

5. An all-steel clutch according to claim 4, wherein the serially connected clutch halves (19,20) have flanges and comprise a disc clutch including a closed annular disc pack (22) connected in a peripheral direction alternately to the flanges of the serially connected clutch halves (19,20).

6. An all-steel clutch according to claim 5, wherein the flanges connected by the closed annular disc pack (22) are connected via a coupling member (25) to determine the axial distance between the flanges.

7. An all-steel clutch according to claim 5, wherein the flanges connected by the closed annular disc pack (22) are axially coupled with adjustable prestressing via an additional spring element (26,27).

8. An all-steel clutch according to claim 4, wherein the serially connected clutch halves (19,20) have further component packs of spring plates (17c,17d) oppositely inclined in the axial normal plane in relation to the at least one component pack of spring plates (17a,17b) of the clutch halves (13,14).

9. An all-steel clutch according to claim 1, wherein the clutch halves are enclosed by a pressure-tight casing (28) comprising an inlet valve (30) receptive of compressed air to axially adjust the distance between the clutch halves.

10. An all-steel clutch according to claim 1, wherein the acute angle is 30° to 60°.

11. An all-steel clutch according to claim 10, wherein the acute angle is 45°.

12. A clutch comprising: a drive shaft; a driven shaft; an intermediate shaft; means connecting the drive shaft to the intermediate shaft to permit axial movement of the intermediate shaft towards and away from the drive shaft; a pair of clutch halves including a first clutch half connected to the intermediate shaft and a second clutch half connected to the driven shaft; and means connecting the first and second clutch halves to each other to convert axial movement of the intermediate shaft into angular rotational movement of the first and second clutch halves relative to each other and thereby the angular rotational movement of the intermediate shaft relative to the driven shaft, whereby the distance between the drive shaft and the driven shaft is constant for different relative angles of the intermediate shaft to the driven shaft.

13. The clutch according to claim 12, further comprising adjusting means connected to the intermediate shaft and receptive of an axially directed force for effecting the axial movement of the intermediate shaft and thereby the angular rotation of the intermediate shift relative to the driven shaft.

14. The clutch according to claim 13, wherein the adjusting means comprises a bearing on the intermediate shaft mounted for angular displacement relative thereto and axial displacement therewith.

15. The clutch according to claim 12, wherein the means connecting the first and second clutch halves comprises spring plates connected at one end to a common radially central area of the first clutch half and connected at their other ends to peripheral areas on the second clutch half and inclined at an acute angle to an axis of the intermediate shaft.

* * * * *